(Model.)

M. C. MORTS.
VEGETABLE CUTTING MACHINE.

No. 252,128. Patented Jan. 10, 1882.

WITNESSES
Fred. G. Dieterich.
P. C. Dieterich.

By his Attorneys

INVENTOR
M. C. Morts,
A. Snow & Co.

UNITED STATES PATENT OFFICE.

MARION C. MORTS, OF MOHAWK, NEW YORK.

VEGETABLE-CUTTING MACHINE.

SPECIFICATION forming part of Letters Patent No. 252,128, dated January 10, 1882.

Application filed April 13, 1881. (Model.)

*To all whom it may concern:*

Be it known that I, MARION C. MORTS, of Mohawk, in the county of Herkimer and State of New York, have invented certain new and useful Improvements in Cutting-Machines; and I do hereby declare that the following is a full, clear, and exact description of the invention, which will enable others skilled in the art to which it appertains to make and use the same, reference being had to the accompanying drawings, which form a part of this specification.

Figure 1:
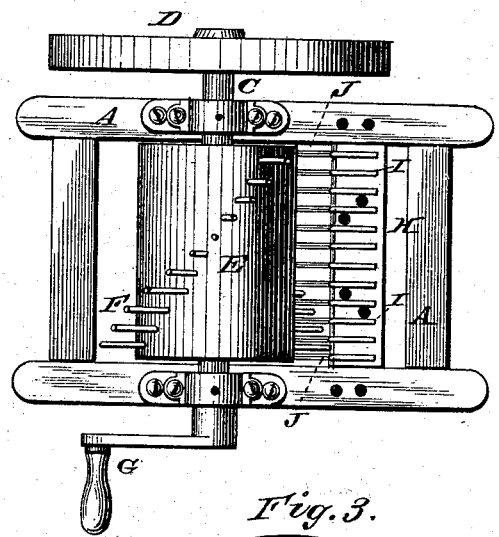
Figure 2:
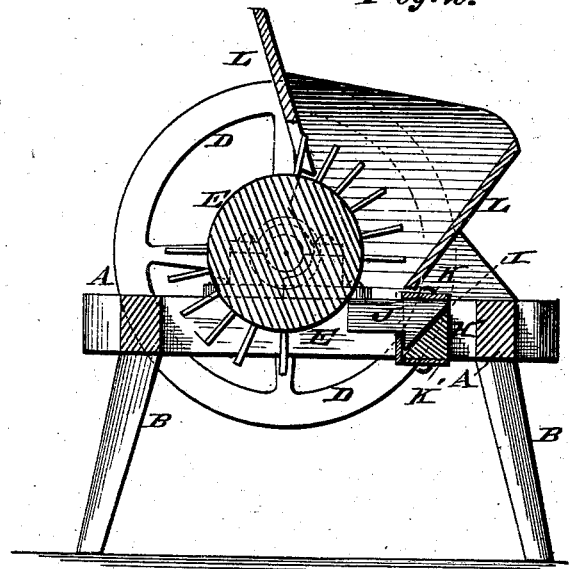
Figure 3:
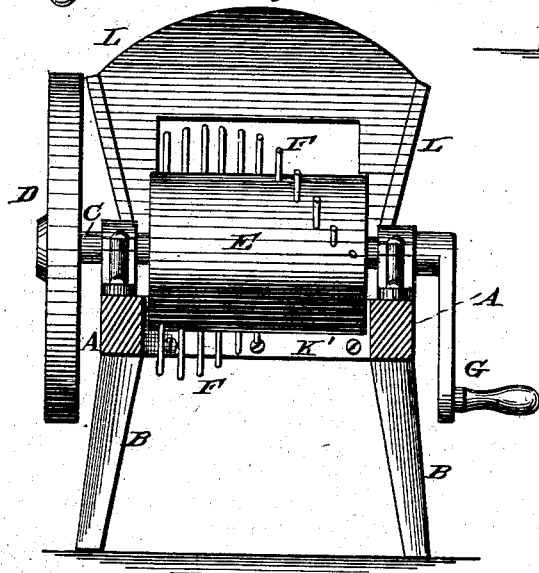
Figure 4:
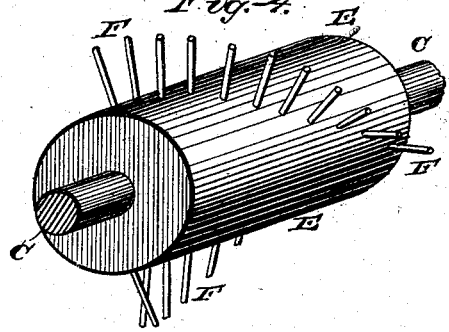

Figure 1 is a top view. Fig. 2 is a longitudinal vertical sectional view. Fig. 3 is a vertical cross-section, and Fig. 4 is a detail view of the cylinder.

Corresponding parts in the several figures are denoted by like letters of reference.

This invention relates to machines for cutting and slicing apples, potatoes, and fruits and roots of all kinds; and it consists in certain improvements in the construction of the same, which will be hereinafter fully described, and particularly pointed out in the claim.

In the drawings hereto annexed, A represents a suitable frame, mounted upon legs B, and provided with bearings for a shaft, C, carrying a fly-wheel, D, and a cylinder, E, provided with fingers F, the arrangement of which will be hereinafter fully described. Shaft C is also provided with a crank or handle, G, by which it may be operated.

H is a cross-piece, fixed transversely in the frame A some distance in front of the cylinder E, and provided with a series of slots or recesses, I, equal distances apart, in which the knives or cutters J, having triangular-shaped shanks, are adjusted and secured by means of a top plate, K, and a right-angular plate, K′, screwed upon the cross-piece H, so as to cover or envelop the shanks of the knives. By this construction great strength and durability are secured. A hopper, L, is secured or adjusted upon the frame A, in front of the cylinder and above the knives or cutters, so as to feed the vegetables to be cut to the knives.

The fingers F, secured in the cylinder E, are arranged in two sets or series diametrically opposite to each other, and each being a segmental series of radiating triangular fingers, as shown. The said fingers, which are of the same length as the knives or cutters, are disposed between the latter as shown.

The operation of my invention will be readily understood from the foregoing description, taken in connection with the drawings hereto annexed. Apples, potatoes, or other fruits or roots being fed into the hopper and the cylinder being rotated, the fingers F will carry or force the contents of the hopper down upon the knives, by which it is cut into slices of the proper size.

My improved vegetable-cutter is simple and inexpensive, and its capacity is greater than that of any cutter with which I am acquainted.

Having thus described my invention, I claim and desire to secure by Letters Patent of the United States—

As an improvement in cutting-machines the combination of the detachable teeth J, having triangular shanks, with the transverse bar H, having correspondingly-shaped recesses, in which the teeth are secured by top and bottom plates, K K′, substantially as and for the purpose shown and specified.

In testimony that I claim the foregoing as my own I have hereto affixed my signature in presence of two witnesses.

MARION C. MORTS.

Witnesses:
J. H. SECKNY,
JACOB BRAZIE.